United States Patent Office 3,736,347
Patented May 29, 1973

3,736,347
SUBSTITUTED ALKENOIC ACIDS AND ESTERS AND SALTS THEREOF
Eric Harold Billett, Harlow, and David Miller, Sevenoaks, England, assignors to Beecham Group Limited, Brentford, Middlesex, England
No Drawing. Filed Aug. 3, 1970, Ser. No. 60,729
Claims priority, application Great Britain, Aug. 5, 1969, 39,123/69
Int. Cl. C07c 63/44, 69/76
U.S. Cl. 260—469                                    11 Claims

ABSTRACT OF THE DISCLOSURE

Substituted alkenoic acids having two phenyl or lower alkoxyphenyl groups and certain derivatives have been found to have estrogenic, e.g., anti-fertility properties for treating menopausal disorders or for estrogenic replacement. Typical compounds are 2-carboxy-5,5-diphenyl-4-methylpent-4-enoic acids, 2-methyl-4-ethyl-5,5-diphenyl-2-carboxypent-4-enoic acid and 2,4-dimethyl-5-phenyl-5-(4-methoxy-phenyl)pent-4-enoic acid. The new compounds are formulated as tablets and capsules for oral use and as injectables with sterile water.

---

The present invention relates to novel substituted alkenoic acids and certain derivatives thereof that have been found to possess pharmacological activity, and particularly potent estrogenic properties. The compounds are therefore of value of antiferitility agents in treating post-menopausal disorders and for other estrogenic replacements. Additionally, some of the compounds of the present invention are dicarboxylic acids and these are valuable intermediates for the corresponding monocarboxylic acids.

Accordingly, the present invention provides substituted alkenoic acids of the general formula:

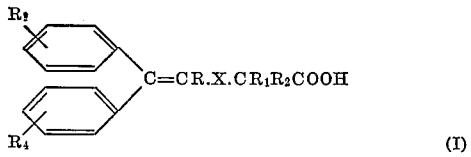

wherein R is a 1–6C alkyl group, or a hydrogen or halogen atom; X is —CH$_2$— or —CH$_2$.CH(CH$_3$)—; R$_1$ is a hydrogen atom or a 1–6C alkyl or 6–10C aryl group; R$_2$ is a hydrogen atom or a carboxyl group; and each of R$_3$ and R$_4$ is a hydrogen atom or a 1–6C alkoxy group; except that when R$_1$–R$_4$ are all hydrogen atoms, R is not a hydrogen atom, and non-toxic salts, esters and amides thereof.

The invention also provides a process for preparing the substituted alkenoic acids of Formula I as defined above, which process comprises reacting a diphenyl compound of the formula:

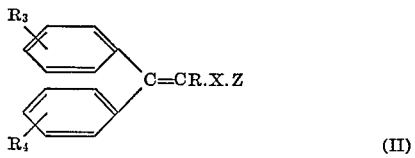

wherein Z is a halogen atom or a reactive sulphonic acid ester group with a malonic acid derivative of the formula:

$$MCR_1(COOR_5)_2 \quad (III)$$

wherein M is an alkali metal and R$_5$ is a 1–6C alkyl group, and if desired hydrolysing the resulting ester to give a compound of Formula I in which R$_2$ is a carboxyl group and optionally decarboxylating by heating to give a compound of Formula I in which R$_2$ is a hydrogen atom, and optionally forming salts, esterifying or forming amides.

Appropriate substituent groups are introduced into the products in known manner. For example, the acids of Formula I may be esterified preferably with hydrocarbyl alcohols, to give hydrocarbyl esters, or they may be converted to the acid chlorides, for example with thionyl chloride, and these on treatment with ammonia give the corresponding amides.

The starting compounds of Formula II are prepared in known manner. Particularly they may be prepared by reacting a ketone of the formula:

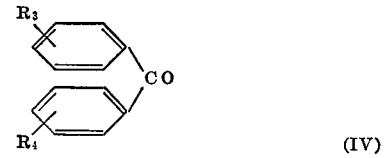

with an ester of the formula:

wherein R, R$_3$, R$_4$ and R$_5$ are as defined above, in presence of zinc or give an ester of the formula:

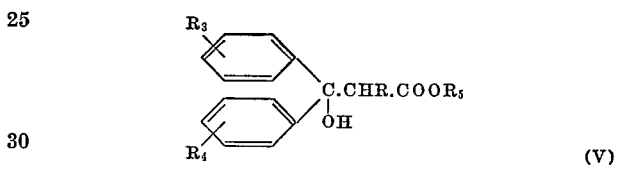

and treating this ester with a dehydrating agent such as phosphorus oxychloride to give an ester of the formula:

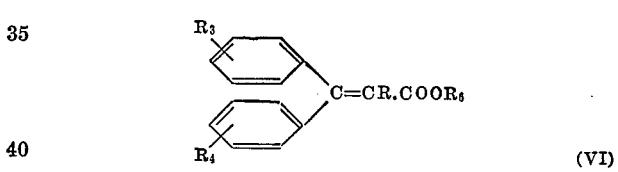

and reducing this ester with a complex metal hydride, then converting the hydroxy group in the resulting alcohol to group Z.

The invention also provides a pharmaceutical composition comprising a compound of Formula I, together with a pharmaceutically acceptable carrier. Suitable carriers include binders, lubricants and other adjuvants for tablet or granular compositions, or soft gelatin capsules, or sterile water for parenteral use.

The following examples illustrate the invention.

EXAMPLE 1

1-bromo-3,3-diphenyl-2-methylprop-2-ene (27.6 g.) was added dropwise to sodio-diethylmalonate [from diethyl malonate (16.0 g.) and sodium (2.3 g.) in ethanol (50 ml.)] to maintain a temperature of 50° C. Sodium bromide separated. After heating under reflux for 3 hours, ethanol was removed in vacuo, water was added, and the product extracted into ether. Removal of solvent after drying (MgSO$_4$) gave a viscous oil (37.0 g., 100%) which was saponified by heating with aqueous potassium hydroxide (20 g. in 30 ml. water) under reflux for 3 hours. After acidification, work up via extraction into ether in the usual way gave a hard resinous material which crystallised from ethyl acetate-light petroleum (B.P. 60–80° C.) to give 2-carboxy-5,5-diphenyl-4-methyl-pent-4-enoic acid (15 g., 48%), M.P. 151° C. decomp. (Found: C, 73.6; H, 6.2; C$_{19}$H$_{18}$O$_4$ requires: C, 73.5; H, 5.85%).

1-bromo - 3,3 - diphenyl - 2 - methylprop-2-ene was prepared (95%) by the action of 48% hydrobromic acid (5× excess) at room temperature for 5 hours on 3,3-diphenyl-2-methylprop-2-en-1-ol. It was used without further purification.

3,3-diphenyl-2-methylprop-2-en-1-ol (95%) M.P. 45–47° C. ex light petroleum (B.P. 60–80° C.) (Found: C, 85.8; H, 7.5; $C_{16}H_{16}O$ requires C, 85.7; H, 7.2%), was in turn prepared by refluxing ethyl α-methyl-β-phenylcinnamate (35.0 g.) (Gazz. Chim. Ital., 1927, 57, 545–550) with lithium aluminum hydride (11.8 g.) in ether (1 l.) for 24 hours.

EXAMPLE 2

2-carboxy-5,5-diphenyl-4-methylpent-4-enoic acid (2.0 g.) was heated in vacuo in an oil bath at 160° C. for 30 minutes. Evolution of carbon dioxide ceased after 15 minutes. Cooling and scratching with a glass rod furnished 5,5-diphenyl-4-methylpent-4-enoic acid (1.7 g., 100%), M.P. 74–75° C. (Found: C, 81.4; H, 7.0; $C_{18}H_{18}O_2$ requires: C, 81.2; H, 6.8%).

EXAMPLE 3

1-bromo-3,3-diphenyl-2-methylprop-2-ene (27.6 g.) was added dropwise to sodio-methyl diethyl malonate [from diethyl methylmalonate (17.3 g.) and sodium (2.3 g.) in ethanol (50 ml.)] to maintain a temperature of 60° C. Proceeding as in Example 1 gave 2-carboxy-2,4-dimethyl-5,5-diphenylphent-4-enoic acid (20 g., 61%), M.P. 175–176° C. ex. ethyl acetate-light petroleum (B.P. 60–80° C.) (Found: C, 73.7; H, 6.15; $C_{20}H_{20}O_4$ requires: C, 74.1; H, 6.2%.)

EXAMPLE 4

2-carboxy - 2,4 - dimethyl-5,5-diphenylpent-4-enoic acid (2.0 g.) was heated in vacuo in an oil bath above its melting point as in Example 2 to give 2,4-dimethyl-5,5-diphenylpent-4-enoic acid (1.67 g., 98%), M.P. 108–109° C. ex. ethyl acetate-light petroleum (B.P. 60–80° C.) (Found: C, 81.3; H, 7.2; $C_{19}H_{20}O_2$ requires: C, 81.4; H, 7.2%).

The action of refluxing methanol-hydrogen chloride on the acid gave its methyl ester (85%), M.P. 56–57° C. ex. ethanol-water (Found: C, 81.4; H, 7.95; $C_{20}H_{22}O_2$ requires: C, 81.6; H, 7.5%.)

EXAMPLE 5

1-bromo - 3,3 - diphenyl-2-methylprop-2-ene (28.6 g.) was added dropwise to sodio-phenyl diethyl malonate [from diethyl phenylmalonate (23.6 g.) and sodium (2.3 g.) in ethanol (50 ml.)] to maintain a temperature of 60° C. Proceeding as in Example 1 resulted in decarboxylation at the saponification stage, and working up yielded 2,5,5-triphenyl-4-methylpent-4-enoic acid (13 g., 38%), M.P. 127–128° C. ex. ethyl acetate-light petroleum (B.P. 60–80° C.) (Found: C, 84.1; H, 6.4; $C_{24}H_{22}O_2$ requires: C, 84.2; H, 6.5%).

EXAMPLE 6

A solution of 1,1-diphenyl-2-bromomethylbut-1-ene (29 g.) in dry tetrahydrofuran was added slowly to a stirred solution of sodio-methyl diethyl malonate (19.6 g.) in the same solvent under reflux, and refluxing was continued for 30 minutes after the addition. Then most of the solvent was evaporated and the residue was taken up in ethanolic potassium hydroxide with addition of a small amount of water to give a clear solution. The mixture was refluxed for 3–4 hours, evaporated to small bulk and the residue in water was washed with ether. The aqueous solution was acidified with dilute sulphuric acid, extracted with ether (5 × 10 0ml.), and the combined extracts were washed with water (100 ml.), dried and evaporated to give 2-methyl-4-ethyl-5,5-diphenyl-2-carboxypent-4-enoic acid, yield 27.4 g. (80%).

This acid was dried and heated at 160–200° C. for 15 minutes, and the product was recrystallised from light petroleum to give 2-methyl-4-ethyl-5,5-diphenylpent-4-enoic acid, 23.7 g. (100%), m. 70° C. (Found: C, 81.4; H, 7.5; $C_{20}H_{22}O_2$ requires: C, 81.6; H, 7.5%.)

The starting 1,1-diphenyl-2-bromo-methylbut-1-ene was prepared by treating the corresponding 2-hydroxy compound with 48% hydrobromic acid. The 2-hydroxy compound was prepared by reduction of ethyl 2-ethyl-3-phenylcinnamate, itself prepared from benzophenone and ethyl α-bromobutyrate.

EXAMPLE 7

1-bromo-3,3-diphenyl-2-methylprop-2-ene, described in Example 1, was allowed to react with sodio-ethyl diethyl malonate as described in Example 6. The resulting diester was hydrolysed and decarboxylated to give 4-methyl-2-ethyl-5,5-diphenylpent-4-enoic acid, m. 70° C. (Found: C, 81.4; H, 7.5; $C_{20}H_{22}O_2$ requires: C, 81.6; H, 7.5%.)

EXAMPLE 8

(a) 2,4-dimethyl-5,5-diphenylpent-4-enoic acid (10 g.) was refluxed with thionyl chloride (20 g.) for 15 minutes, and the excess of thionyl chloride was removed under vacuum. The resulting acid chloride (1 g.) was allowed to react with methanol (excess) in dichloromethane (25 ml.) at 25° C. for 1 hour, then evaporation gave the methyl ester, m. 56–7° C. after recrystallisation from light petroleum. (Found: C, 81.4; H, 7.9; $C_{20}H_{22}O_2$ requires: C, 81.6; H, 7.5%.)

(b) By using n-heptanol instead of methanol the n-heptyl ester was prepared similarly, and it had B.P. 190° C./0.5 mm. (Found: C, 82.4; H, 9.0; $C_{26}H_{34}O_2$ requires: C, 82.5; H, 9.0%.)

(c) The starting acid was neutralised with sodium hydroxide in aqueous solution to give on evaporation the sodium salt. (Found: C, 75.3; H, 6.4; Na, 7.3; $C_{19}H_{19}O_2$Na requires: C, 75.5; H, 6.3; Na, 7.6%.)

(d) The acid chloride was prepared as described above in (a) and 1 g was shaken with excess concentrated aqueous ammonia, then the solid was filtered off and recrystallised from light petroleum to give the amide, m. 127° C. (Found: C, 81.5; H, 7.68; N, 4.95; $C_{19}H_{21}ON$ requires: C, 81.6; H, 7.53; N, 4.85%.)

The acid chloride was prepared as described above in (a) and 1 g was dissolved in dry ether and poured into a large excess of diazomethane. After 3 hours the mixture was evaporated to leave a yellow crystalline solid, which was taken up in dry methanol, silver oxide (1 g.) was added and the mixture was refluxed for 3 hours, filtered and evaporated. The residue in water was washed with ether, acidified and extracted with ether and the solution evaporated to give 3,5-dimethyl-6,6-diphenylhex-5-enoic acid, m. 110° C.

EXAMPLE 9

(a) Benzophenone (0.3 mole) in dry tetrahydrofuran (50 ml.) was added to a solution of vinyl magnesium bromide (0.3 mole) in dry tetrahydrofuran at 0° C. The mixture was allowed to stand for a few hours, then excess aqueous ammonium chloride was added and the organic layer was separated, washed, dried and evaporated to give a clear oil. This oil was treated with 48% hydrobromic acid (0.5 mole) at 25° C. for 5 hours, then the resulting bromide was condensed with sodio-methyl diethyl malonate, and the ester was hydrolysed and decarboxylated as described in Example 7 to give on distillation 2-methyl-5,5-diphenylpent-4-enoic acid. (Found: C, 81.7; H, 6.9; $C_{18}H_{18}O_2$ requires: C, 81.4; H, 6.8%.)

(b) This acid (2 g.) was treated with excess of bromine in dichloromethane for 30 minutes at room temperature. The solution was washed with aqueous sodium thiosulphate and evaporated, and the resulting solid was recrystallised from t-butanol and light petroleum to give a dibromide, m. 135° C., (3 g.; 94%). This material was refluxed with potassium t-butoxide in t-butanol for 15 minutes, cooled, diluted with water and partitioned between 5% aqueous sodium hydroxide and ether. The ether layer was washed, dried and evaporated to give a white solid, presumed to be the lactone and having $\gamma_{max}$. 1760 cm.⁻¹ (Nujol). The aqueous layer was acidified and extracted with ether, and treatment of the extract gave a mixture of starting acid and 2-methyl-5,5-diphenyl-4-bromopent-4-enoic acid. The acids were esterified with diazomethane and the methyl esters were separated by gas-liquid chromatography.

EXAMPLE 10

By using the method of Example 6 1,1-diphenyl-2-hydroxy-methylpent-1-ene (obtained from benzophenone and ethyl α-bromovalerate) was brominated and condensed with sodiomethyl diethyl malonate, and the resulting ester was hydrolysed and decarboxylated to give 2-methyl-4-diphenylmethyleneheptanoic acid as a gum.

EXAMPLE 11

2-methyl-3,3-di-(4-methoxyphenyl)-prop - 2 - enoic acid (obtained from 4,4-dimethoxybenzophenone and ethyl α-bromopropionate) was reduced with lithium aluminum hydride, brominated with 48% hydrobromic acid and condensed with sodio-methyl diethyl malonate, hydrolysed and decarboxylated as described in Example 6 to give 2,4-dimethyl-5,5-di-(4-methoxyphenyl)-pent-4-enoic acid as a gum.

EXAMPLE 12

2-methyl-3-phenyl-3-(4-methoxyphenyl)-prop - 2 - enoic acid ethyl ester was prepared from p-methoxybenzophenone and ethyl α-bromopropionate. The intermediate ester was hydrolysed with ethanolic potassium hydroxide and worked up to give 2-methyl-3-phenyl-3-(4-methoxy-phenyl)prop-2-enoic acid, M.P. 127–40° C. (Found: C, 76.0; H, 6.14; $C_{18}H_{18}O_4$ requires: C, 76.1; H, 6.0.)

This acid was reduced, brominated and condensed with sodio-methyl diethyl malonate, then hydrolysed and decarboxylated as described in Example 6 to give 2,4-dimethyl-5-(4-methoxy-phenyl)pent-4-enoic acid, m. 113–4° C.

What is claimed is:
1. A substituted alkenoic acid of the formula:

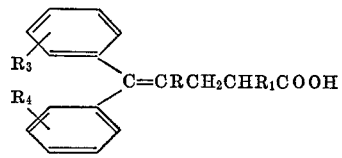

wherein R is hydrogen, halogen or alkyl of 1 to 6 carbon atoms, $R_1$ is hydrogen, alkyl of 1 to 6 carbon atoms or aryl of 6 to 10 carbon atoms and each of $R_3$ and $R_4$ is hydrogen, except that when $R_1$, $R_3$ and $R_4$ all hydrogen, R is not hydrogen, or a non-toxic salt thereof or an alkyl ester of 1 to 7 carbon atoms thereof.

2. A compound according to claim 1 wherein R is hydrogen, halogen, methyl or ethyl, $R_1$ is hydrogen, methyl, ethyl or phenyl and said ester is a methyl ester.

3. 5,5-diphenyl-4-methylpent-4-enoic acid or a non-toxic salt thereof.

4. 2,4-dimethyl-5,5-diphenylpent-4-enoic acid a methyl or n-heptyl ester thereof or a non-toxic salt thereof.

5. 2,5,5-triphenyl-4-methylpent-4-enoic acid or a non-toxic salt thereof.

6. 2-methyl-4-ethyl-5,5-diphenylpent-4-enoic acid.

7. 4-methyl-2-ethyl-5,5-diphenylpent-4-enoic acid.

8. 3,5-dimethyl-6,6-diphenylhex-5-enoic acid.

9. 2-methyl-5,5-diphenylpent-4-enoic acid.

10. 2-methyl-5,5-diphenyl-4-bromopent-4-enoic acid.

11. 2-methyl-4-diphenylmethyleneheptanoic acid.

No references cited.

LORRAINE A. WEINBERGER, Primary Examiner

R. S. WEISSBERG, Asssiant Examiner

U.S. Cl. X.R.

260—473 R, 475 SC, 475 N, 515 R, 515 P&A, 520, 558 R, 559 P, 618 H; 424—308, 317, 324